L. A. HOERR.
HINGE OF FLEXIBLE MATERIAL.
APPLICATION FILED FEB. 13, 1915.
1,167,070.　　　　　　　　　　　　　　　　Patented Jan. 4, 1916.
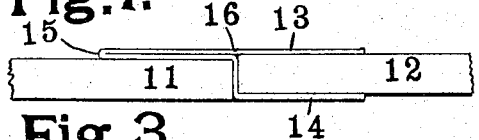
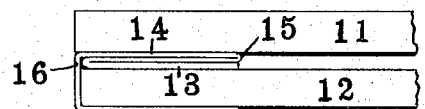
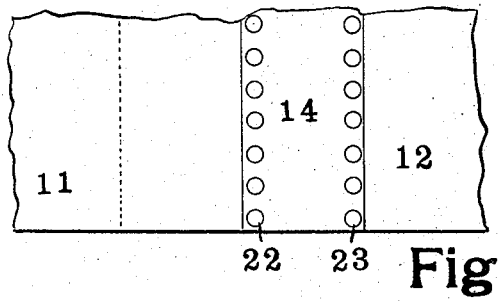
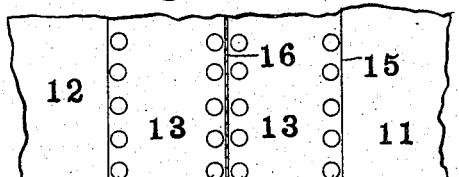
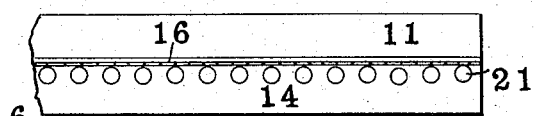
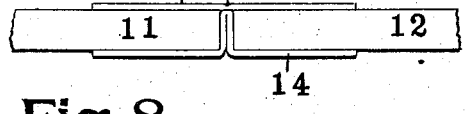
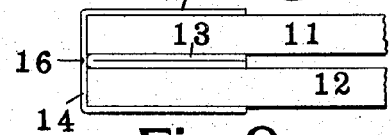
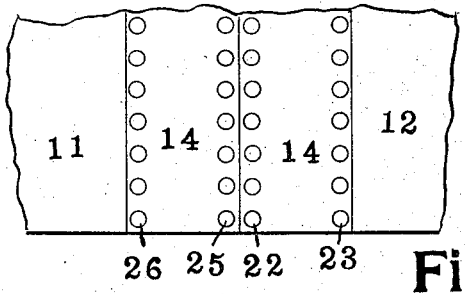
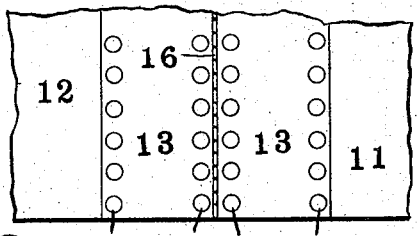
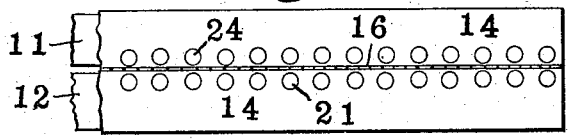
WITNESSES:
W. T. Alexander.
G. M. Thorr.
INVENTOR
LOUIS A. HOERR.
BY
E. E. Huffman
ATTORNEY
COLUMBIA PLANOGRAPH CO., WASHINGTON, D. C.

UNITED STATES PATENT OFFICE.

LOUIS A. HOERR, OF ST. LOUIS, MISSOURI.

HINGE OF FLEXIBLE MATERIAL.

1,167,070.   Specification of Letters Patent.   Patented Jan. 4, 1916.

Application filed February 13, 1915. Serial No. 8,095.

*To all whom it may concern:*

Be it known that I, LOUIS A. HOERR, a citizen of the United States of America, residing in the city of St. Louis, State of Missouri, have invented a certain new and useful Hinge of Flexible Material, of which the following is such a full, clear, and exact description as will enable any one skilled in the art to which it appertains to make and use the same, reference being had to the accompanying drawings, forming part of this specification.

My invention relates to a hinge of flexible material and has for its object the production of a hinge which will be simple and light in construction and which, at the same time, will be very strong and durable and which will present substantially no projecting portions in either its extended or folded positions.

In the accompanying drawings, which illustrate two forms of hinge made in accordance with my invention, Figure 1 is an end view showing the connecting members in their extended position; Fig. 2 is a view similar to Fig. 1, but showing the members in their folded position; Fig. 3 is a side view of the form of hinge shown in Fig. 1 and Fig. 2; Fig. 4 is a view similar to Fig. 3, but looking from the opposite side; Fig. 5 is an edge view showing the parts in their folded position; Fig. 6 is an end view of a slight modification, showing the parts in their extended position; Fig. 7 is a view similar to Fig. 6, but showing the parts in their folded position; Fig. 8 is a side view of the hinge shown in Figs. 6 and 7; Fig. 9 is a view similar to Fig. 8, but looking from the opposite side; and Fig. 10 is an edge view of the form of hinge shown in Figs. 6 to 9.

Referring first to Figs. 1 to 5, 11 and 12 represent two members which are to be hinged together. These members 11 and 12 are connected by means of two ply of flexible material, preferably textile material such as strong canvas. The two ply are marked 13 and 14. In this form of my invention, the two plies 13 and 14 of flexible material are connected at one edge 15 and are also connected by a row of stitching 16 which forms the line of flexure of the hinge. The two folds 13 and 14, adjacent to the edge 15, are secured to the member 11 by means of nails. I prefer to use two rows of nails 17 and 18, as best shown in Fig. 4, the row 17 being arranged adjacent to the edge 15 and the row 18 adjacent to the member 11. Beyond the line of stitching 16, the plies 13 and 14 of flexible material are separated and the member 12 is placed between these plies. The ply 13 is secured to one face of the member 12 by means of nails which are preferably arranged in two rows 19 and 20, the row 19 being arranged adjacent to the edge of the member 12 and the row 20 adjacent to the edge of the ply 13 of flexible material. The ply 14 passes around the edge of the member 12 and is preferably secured thereto by a row of nails 21. It is also secured to the side of the member 12 opposite the ply 13 by means of two rows of nails 22 and 23, as best shown in Fig. 3 of the drawings.

In Figs. 6 to 10, I have shown a slight modification in which the two plies of flexible material 13 and 14 are not connected at the edge 15, but are only connected by the row of stitching 16 forming the line of flexure of the hinge. In this construction, the ply 14 is brought around to the edge of the member 11 exactly in the same manner as around the edge of the member 12 and is connected thereto in the same manner by a row of nails 24 similar to the row of nails 21 hereinbefore referred to, and by rows of nails 25 and 26 similar to the rows of nails 22 and 23.

In practice, the plies of material will be very thin compared with the thickness of the members 11 and 12, even when thin pieces of wood form these members and, consequently, there is substantially no projection in the hinge, either in its extended or in its folded position. Furthermore, as the nails forming the various rows of fasteners, hereinbefore described, may be placed as close together as desired, the hinge may be firmly attached to very thin pieces of wood, which would not be the case in the use of ordinary metallic hinges in which the number of fastening screws or nails is limited.

It will be evident that while my hinge is very simple and cheaply constructed, it will be neat in appearance and strong and durable.

Having fully described my invention, what I claim as new and desire to secure by Letters-Patent of the United States is:

1. A hinge comprising two members to be connected, and two ply of flexible material secured to said members, one of said members having its edge and both sides adjacent thereto covered by said flexible material.

2. A hinge comprising two members to be connected, and two ply of flexible material secured together along the line of flexure of the hinge, said flexible material covering the edges of each of said members and the sides adjacent thereto.

3. A hinge comprising two members to be connected, two ply of flexible material stitched together along the line of flexure of the hinge, and nails securing said textile material to two sides and one edge of one of said members.

In testimony whereof, I have hereunto set my hand and affixed my seal in the presence of the two subscribing witnesses.

LOUIS A. HOERR. [L. S.]

Witnesses:
W. A. ALEXANDER,
G. W. SHORE.

Copies of this patent may be obtained for five cents each, by addressing the "Commissioner of Patents Washington, D. C."